INVENTORS
Thomas W. Loring
Stanley R. Carson
Raymond C. Davis

July 30, 1957 — T. W. LORING ET AL — 2,800,730
STEERING WHEEL
Filed Sept. 4, 1953 — 2 Sheets-Sheet 2

INVENTORS
Thomas W. Loring
Stanley R. Carson
Raymond C. Davis
BY
Attorney

United States Patent Office 2,800,730
Patented July 30, 1957

2,800,730

STEERING WHEEL

Thomas W. Loring, Lansing, Mich., and Stanley R. Carson and Raymond C. Davis, Dayton, Ohio, assignors to General Motors Corporation, Detroit, Mich., a corporation of Delaware Application September 4, 1953, Serial No. 378,522

4 Claims. (Cl. 40—2.2)

This invention relates to hand wheels and more especially to steering wheels as used in connection with automotive vehicles.

An object of the present invention is to provide a steering wheel with a recess in a body portion thereof and an insert with an insignia associated therewith so the insignia will be suitably located on the steering wheel when the insert is positioned in said recess.

It is an object of the present invention to provide a steering wheel with a recess in a body portion thereof so that a transparent insert having an insignia associated therewith may be positioned and secured therein.

Another object of the present invention is to provide a steering wheel with a transparent or partially transparent insert which is securely held in a recess formed in the body portion thereof so that an insignia associated with the insert will be visible through the transparent portion of the material of the insert.

It is another object of the present invention to form an ornamental steering wheel by a method wherein the steps include; providing a steering wheel with a recess on a rim portion thereof, providing an insert of transparent material having a shape complementary to the shape of the recess and a surface portion corresponding to the outer configuration of the body portion of said wheel said insert having an insignia associated therewith and finally securing said insert in the recess, so that surface portions thereof will correspond to the surface of the wheel and the insignia portion associated therewith will be visible through the transparent material of the insert.

Further objects and advantages of the present invention will be apparent from the following description reference being had to the accompanying drawings wherein a preferred embodiment of the present invention is clearly shown.

Figure 1:
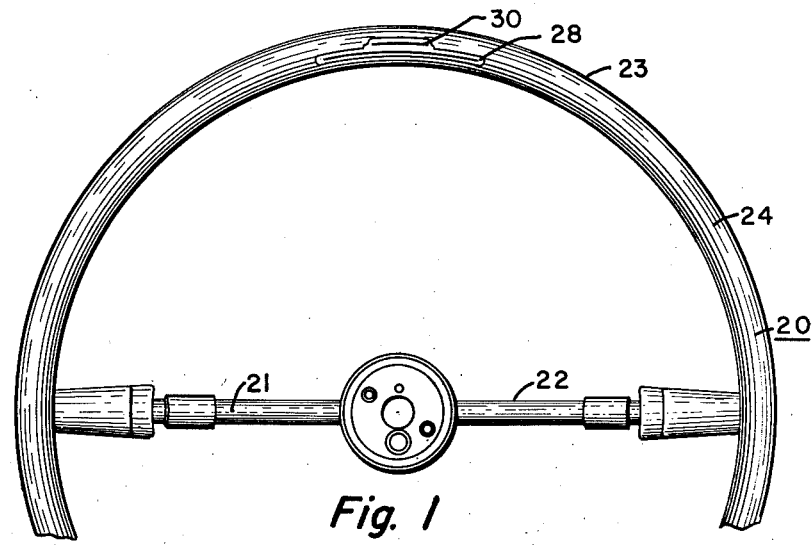
Fig. 1 is a plan view of a steering wheel with an insignia located in a portion of its rim.
Figure 2:
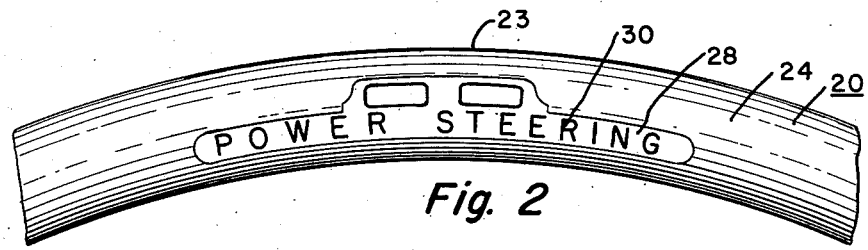
Fig. 2 is an enlarged view of a portion of the steering wheel wherein an insignia carrying insert is positioned.
Figure 3:
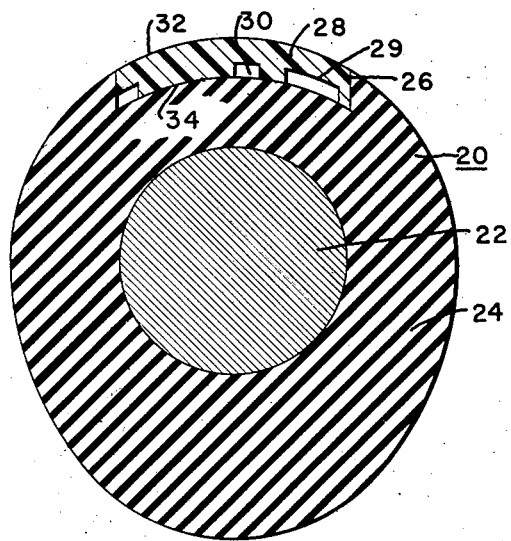

Fig. 3 in cross section shows an insert having an embossed insignia formed on a face of the insert that is positioned in a suitable recess in the body of a steering wheel.

Figures 4, 5, 6, 7:
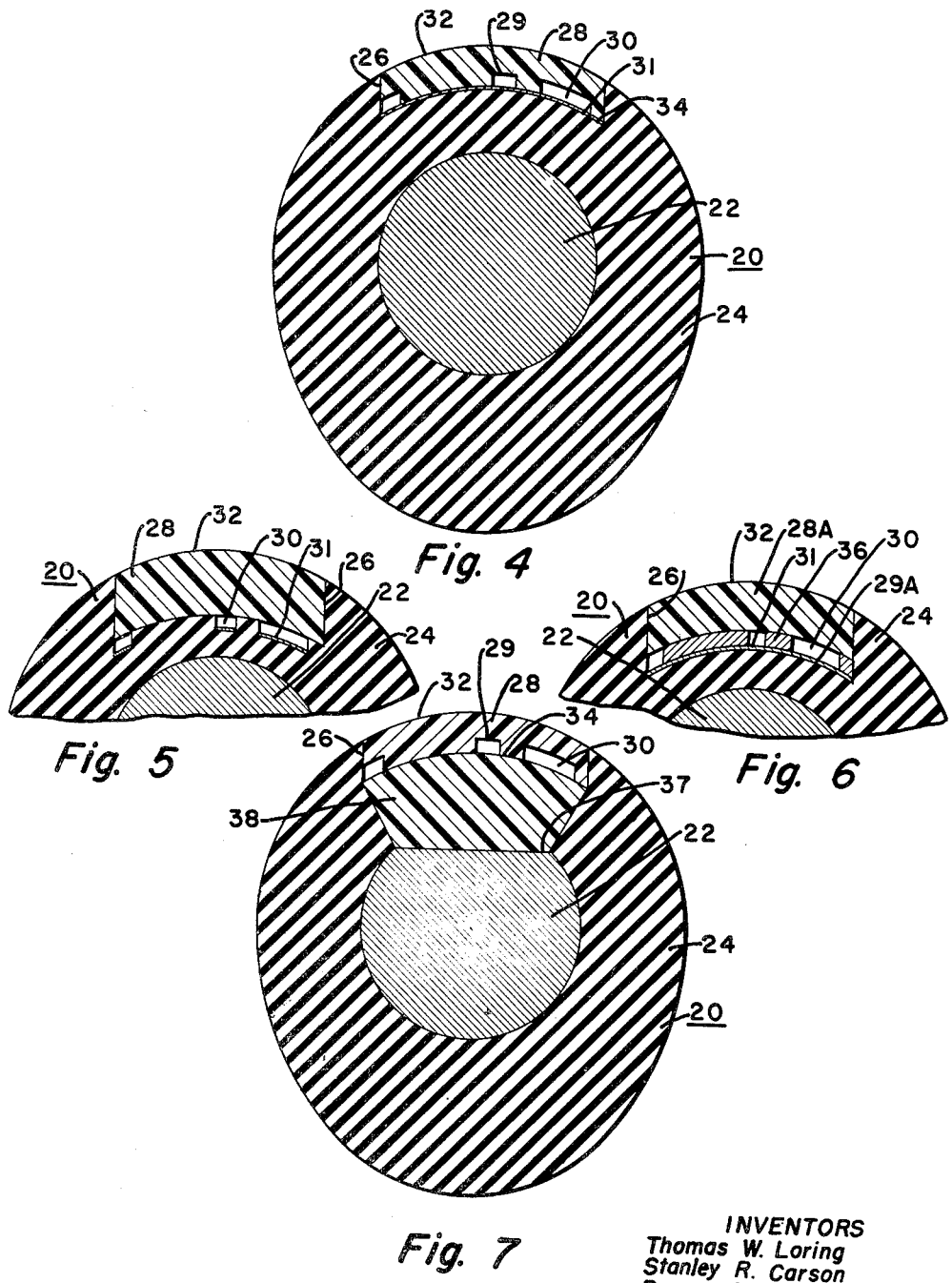

Fig. 4 in cross section shows a modification as shown in Fig. 3 wherein a metallic foil between the insert and the body portion and the wheel acts as a reflecting surface for the insignia formed in the insert.

Fig. 5 is another modification of the steering wheel in Fig. 3 wherein the embossed insignia is formed on the body portion of the steering wheel.

Fig. 6 is a further modification wherein a separate insignia is positioned between the insert and the body of the steering wheel.

Fig. 7 is a further modification wherein a polished portion of the metal reenforcing member of the wheel acts as a reflecting surface for the insignia formed in the insert.

In the drawings, numeral 20 designates a steering wheel having a reenforcing member 22 that is at least partially covered by a molded body portion 24 to form spokes 21 and a rim portion 23. The body portion 24 of rim 23 has a suitably formed recess 26 formed thereon so an insert 28, made from a transparent plastic material, may be secured therein. An insignia 30 associated with insert 28 is arranged so it is visible through the material of the insert when it is received in recess 26.

Insert 28 is sized so as to be snugly secured in recess 26 by a suitable means, and has an outer surface 32 that is shaped to conform to the contours of the outer surface of the body portion 24 of wheel 20 to form a continuous outer surface for steering wheel 20 when the insert 28 is in position. A surface 34, remote from outer surface 32, has (Figs. 3, 4 and 7) an insignia embossed therein so it will appear through the transparent material of insert 28 in raised relief.

The design preferably may have a contrasting surface 29 formed on portions thereof by any suitable method, i. e., painting, metal depositing, as in Fig. 3, or a metallic foil 31, as in Fig. 4, which may be formed in various ways; for example as in Figures 5, 6 and 7 so as to enhance the appearance of steering wheel 20.

In Fig. 5 the insignia 30 is formed in the body portion 24 of the steering wheel 20. In Fig. 6 a separate design 36 is positioned between insert 28A and body portion 24. This modification comprehends an arrangement whereby the insignia may consist of individual sections or letters that are reflected by a contrasting surface 29A formed on the interior portions of recess 26, manifestly in this embodiment the sections or letters may be suitably secured to a metal foil so they are maintained in correct position by the foil and are reflected thereby.

In Fig. 7 a portion 37 of the metallic reenforcing member 22 has been suitably shaped and polished to provide a metallic reflecting surface for the insignia 30 associated with insert 28. In this embodiment, the recess portion 26 of steering wheel body 24 extends in depth to the metallic reenforcing member 22 so a second transparent insert 38 may be positioned between insert 28 and a polished portion 37 will pass light so the design 30 may be visible through insert 28.

It is apparent that according to the present invention any suitable design or mark may be provided on the rim of a steering wheel. These designs may be of any desired shape and may consist of any insignia, indicia, mark, name, trademark, trade-name, crest, seal, or any other form as may be proper in a steering wheel.

In forming the contrasting surfaces, any suitable method, such as painting, metal deposition or a colored or metallic foil or leaf may be used and the present invention also comprehends the use of a two-step molding process wherein various colored plastics may form the insert and/or insignia which may be located in either rim or spoke portions of the steering wheel and be there secured by any suitable cement, glue, other suitable cohesive material and other securing means as pegs, dowels, etc.

It is apparent the present invention comprehends the positioning of the insignia portion of the insert beneath the outer surface of the insert. Manifestly the insignia may also extend to the outer surface of the insert or even project beyond the surface of the body portion of the wheel as disclosed and claimed in U. S. patent application Ser. No. 378,559, and assigned to the assignee of the present invention. In this embodiment the insignia is properly formed and located in the insert and if desired, the insert may be of other than transparent material wherein the insignia may be formed as a separate part and included therein by a two step molding process or be formed as an integral part by any other suitable method hereinbefore set forth.

While the embodiment of the present invention as herein disclosed constitutes a preferred form, it is to be understood that other forms might be adopted.

What is claimed is as follows:

1. In a method for forming an ornamental steering wheel, the steps comprising; forming a steering wheel having an open recess on a portion of its rim in alignment with a polished surface portion on an embedded reinforcing member therefor, forming a pair of inserts of transparent material each sized to be snugly received in said recess with one of said inserts having a smooth top surface and an insignia adjacent a bottom surface and the other insert being of contrasting color than said one insert, and finally inserting and securing said inserts in said recess so the other of said inserts is in contact with the polished surface of the reinforcing member on said member so the polished surface and the contrasting color of said other layer will appear as a background for the design adjacent said one insert when said design is viewed through said top surface.

2. An ornamental steering wheel comprising in combination; a metal reinforcing rim having a polished portion, a molded body covering at least a portion of said reinforcing rim and having a predetermined outer surface configuration, an open recess in said molded body in alignment with the polished portion of said rim, an insert of transparent material sized to be received in said recess having outer and inner surface portions wherein the outer surface portion has a shape corresponding in shape to the outer configuration of said body for providing a continuation thereof when said insert is positioned in said recess, an insignia associated with the inner surface of said insert, a contrasting surface disposed between said insignia and rim, said insignia and the contrasting surface being visible through the transparent material of said insert and reflected by the polished surface of said rim when said insignia is viewed from the outer surface of said insert and when said insert is in said recess, and means for securing said insert in said recess for providing insignia in a steering wheel that is visible through the material of the insert.

3. The steering wheel as set forth in claim 2 wherein the insignia associated with said insert having raised surface portions thereon, includes raised surface portions on the inner surface of said insert which raised portions are visible through the transparent material of said insert.

4. The steering wheel as set forth in claim 2 wherein the insignia associated with said insert includes a second insert of transparent material that is sized to be received in a recess of the rim and support the inner surface of said insert and the contrasting surface consists of a polished surface portion of the metal reinforcing rim of said steering wheel.

References Cited in the file of this patent
UNITED STATES PATENTS

| | | |
|---|---|---|
| 430,774 | Hamilton | June 24, 1890 |
| 1,626,383 | Boedtcher | Apr. 26, 1927 |
| 1,916,753 | Clarke | July 4, 1933 |
| 2,001,349 | Husted | May 14, 1935 |
| 2,085,023 | Husted | June 29, 1937 |
| 2,114,711 | Horinstein | Apr. 19, 1938 |
| 2,367,800 | Rakas | Jan. 23, 1945 |
| 2,383,884 | Palmquist | Aug. 28, 1945 |